US008898726B2

(12) United States Patent
Burns et al.

(10) Patent No.: US 8,898,726 B2
(45) Date of Patent: Nov. 25, 2014

(54) ADAPTABLE DATA RECEIVING APPARATUS

(75) Inventors: Gary Burns, Shipley (GB); Chris Hughes, Shipley (GB)

(73) Assignee: Pace Plc, Shipley (GB)

( * ) Notice: Subject to any disclaimer, the term of this patent is extended or adjusted under 35 U.S.C. 154(b) by 84 days.

(21) Appl. No.: 13/044,795

(22) Filed: Mar. 10, 2011

(65) Prior Publication Data

US 2011/0225621 A1 Sep. 15, 2011

(30) Foreign Application Priority Data

Mar. 10, 2010 (GB) .................................. 1003946.9

(51) Int. Cl.
H04N 7/16 (2011.01)
H04N 5/781 (2006.01)
G06F 1/20 (2006.01)
H04N 21/4147 (2011.01)
H04N 21/426 (2011.01)
H04N 21/433 (2011.01)

(52) U.S. Cl.
CPC ................ *H04N 5/781* (2013.01); *G06F 1/203* (2013.01); *G06F 1/20* (2013.01); *G06F 1/206* (2013.01); *H04N 21/4147* (2013.01); *H04N 21/42669* (2013.01); *H04N 21/4334* (2013.01)
USPC ............................ 725/151; 725/152; 725/153

(58) Field of Classification Search
USPC ....................................................... 725/151
See application file for complete search history.

(56) References Cited

U.S. PATENT DOCUMENTS

| 5,896,557 | A | * | 4/1999 | Suzuki et al. | ................. 725/139 |
| 6,069,792 | A | * | 5/2000 | Nelik | ....................... 361/679.47 |
| 6,311,268 | B1 | * | 10/2001 | Chu | .................................. 713/1 |
| 7,496,493 | B1 | * | 2/2009 | Stevens | ........................... 703/24 |
| 2001/0029583 | A1 | * | 10/2001 | Palatov et al. | ................ 713/193 |
| 2003/0070181 | A1 | * | 4/2003 | Holm | ............................ 725/134 |
| 2005/0078938 | A1 | * | 4/2005 | Crohas | ............................ 386/46 |
| 2008/0002951 | A1 | * | 1/2008 | Russ et al. | ..................... 386/124 |
| 2008/0162925 | A1 | * | 7/2008 | Okaya | ............................ 713/155 |

* cited by examiner

*Primary Examiner* — Pankaj Kumar
*Assistant Examiner* — Timothy Newlin
(74) *Attorney, Agent, or Firm* — Head, Johnson & Kachigian, P.C.

(57) ABSTRACT

The invention relates to apparatus which can be used in first and second modes and to the manner in which the change in modes of operation can be achieved. In a first mode, the apparatus operates to receive data which is received typically from a television programme broadcast system and process the same and in the second mode the apparatus has the additional feature of a data storage device in which received data can be stored and be made available for subsequent retrieval. The data storage device can be provided as part of an assembly which can be mechanically and electrically connected to the apparatus housing and which allows the transfer of data between the assembly and the remainder of the apparatus. In one embodiment the assembly also includes cooling means which allow a cooling functionality to be provided to the apparatus.

9 Claims, 2 Drawing Sheets

ADAPTABLE DATA RECEIVING APPARATUS

The invention to which this application relates is to data receiving apparatus which can be adapted to have a storage facility for the selective storage of digital data therein.

The provision of apparatus to receive digital data which is broadcast from a remote location head end, typically by satellite, cable or other digital data transmission systems, is well known. In one embodiment, the digital data which is transmitted and received, is used to generate audio, video and/or auxiliary information which, in combination, can be used to generate radio, television and/or other information resources for one or a plurality of users of the apparatus. Typically, in this form of system there is provided, at the receiving location, data receiving and processing apparatus which is commonly known as a "set top box" and which includes means for receiving the data, decoding the same and processing the decoded data to form the audio, video and/or further information which is then generated to the user, typically via speakers and a display screen which are commonly integrated into a television set. In certain embodiments the set top box can also be integrated into the television set, or may be provided as a stand alone unit.

Conventionally, the set top box provided with a relatively limited memory facility which is used in the processing of the received digital data or can be provided with the limited memory facility and an additional storage facility which allows data relating to specific programs to be stored for subsequent retrieval for viewing. Typically, this further storage facility can be provided in the form of a hard disc drive which is provided within the set top box and integrally therewith.

It has been found that as the advantages of the provision of the further storage facility become apparent to the users of apparatus which does not include the same, there is an increasing demand for that form of set top box to be swapped for an upgraded set top box with the said further storage facility. Conventionally, this requires the removal of the original set top box and replacement with a new set top box which includes the further storage facility therein. However, this form of upgrading requires at least one visit to be made by an operator to the location of the original set top box in order to remove the same and install a new set top box with the further storage facility. This is unsatisfactory to the provider of the set top box apparatus as they have to arrange for and make the visit and supply two versions of the products.

An aim of the present invention is therefore to provide a means whereby a set top box without a storage facility can be adapted to include the data storage facility in a manner which ensures that the same can be achieved efficiently while, at the same time, ensuring that the operation of the set top box is maintained once the data storage facility has been added.

In a first aspect of the invention, there is provided apparatus for the reception and processing of digital data to represent audio, video and/or auxiliary information to a user of the apparatus wherein said apparatus is adaptable between a first mode in which to receive and process the said data and a second mode in which there is provided a data storage device to allow the apparatus to have a data storage facility for the storage of the received data in addition to the processing of the same.

Typically the second mode provides a data storage facility which is of a size to receive and store sufficient data to allow video and/or audio to be generated therefrom for viewing and/or listening at a selected time subsequent to the time of receipt of the data by the said apparatus. In one embodiment the quantity of data which can be stored in the data storage device is at least sufficient to allow a television or radio programme to be generated from the data in the storage device.

In one embodiment, the adaptation between modes is achieved by providing an assembly which can be electrically and mechanically engaged with the apparatus of the first mode and connected to allow data transfer between the same.

In one embodiment, the said assembly includes a data storage device in the form of a hard disk drive, and a cooling means. In one embodiment, the cooling means is a fan which is provided to be operable once the assembly is electrically and mechanically connected with the said apparatus.

In one embodiment the apparatus, in the first mode, includes a housing having a recess formed therein, said recess including electrical, data and/or mechanical connection means to allow the said assembly to be mechanically and electrically connected thereto and to allow the passage of data between the storage device and the processing means.

In one embodiment, when the apparatus is in a first mode, the recess is preferably enclosed by a masking means, or alternatively, can be left open and, when the apparatus is to be adapted to the second mode, the recess is exposed and receives therein the assembly including the data storage device and the cooling means.

In one embodiment, the recess is located on the base and/or side of the apparatus and the assembly can be located in the recess without the need to remove any other part of the housing of the apparatus. This means that an operator does not need to gain access to any other components internally of the apparatus to change the operation of the same. This therefore allows the format of the apparatus to be relatively easily changed and to be performed efficiently in an uncontrolled or non-factory environment.

In one embodiment, when the data storage device is a hard disc drive the type which is used is a 2½ inch hard disc drive.

In one embodiment, the assembly is located underneath the location of the printed circuit boards in the housing of the apparatus.

Typically, the components of the assembly include the only mechanically moving components of the apparatus and therefore, if there is a malfunction of the same, this can be rectified by removal of the assembly and repair or replacement with a new assembly, this being achievable without the need to gain access to other parts of the housing. It also means that if there is a mechanical malfunction of the parts in the assembly, the same can be removed and the apparatus is therefore still operable in the first mode.

Typically, once the assembly is located in position, the operating mode of the apparatus is adjusted so as to allow usage of the further storage facility to store received digital data therein and to allow the stored data to be retrieved subsequently as and when required. In one embodiment a software upgrade may be required to be downloaded to the apparatus or, alternatively the appropriate software for the second mode of operation is already installed and the connection of the assembly automatically causes the operating mode to change.

In a further aspect of the invention, there is provided an assembly for use to adapt apparatus for the receipt and processing of digital data, said assembly including a data storage device and connection means to allow said assembly to be mechanically and electrically connected in order to adapt said apparatus to include a storage facility and allow the transfer of data between said assembly and the apparatus.

In one embodiment, the assembly includes a cooling means provided as an integral part thereof and this cooling means in one embodiment, is a fan.

Specific embodiments of the invention are now described with reference to the accompanying drawings wherein.

Figure 1:
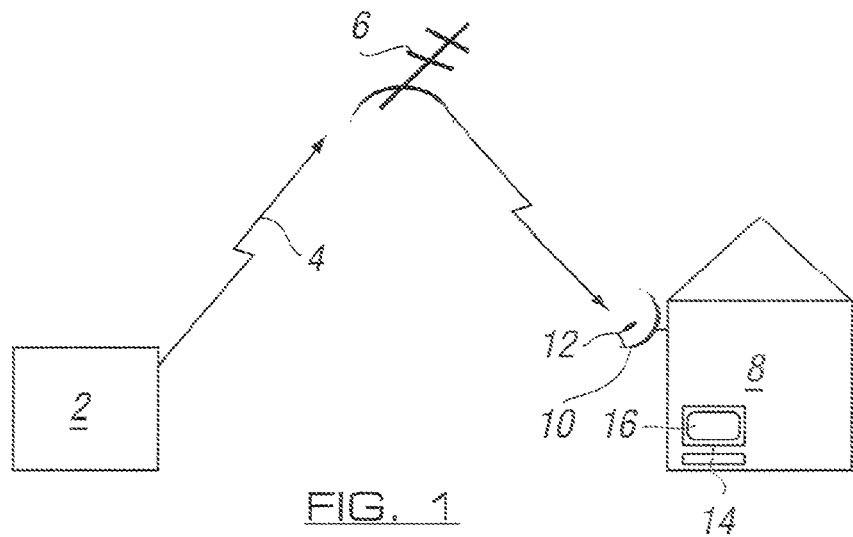
FIG. 1 illustrates, in a schematic manner, an example of a digital data broadcasting system with which the apparatus in accordance with the invention can be used.

Referring firstly to FIG. 1, there is illustrated in a schematic manner, an example of a system for broadcasting digital data. In this case, a satellite broadcast system is shown although it should be appreciated that the apparatus of the invention can be used with any data broadcast system such as, for example, a cable broadcast system. The system, in this example, comprises a broadcaster head end 2 which generates digital data 4 which represents audio, video and/or further information. The data is then transmitted via a satellite 6 to a number of locations 8, one of which is shown. Each location is provided with an antenna 10 and LNB 12 which are connected to a set top box 14 located within the premises. The set top box is provided with means to decode the received data, process the same and then generate audio, video and/or other information which can be viewed or listened to via television signals or other audio and video generating means 16.

The set top box is typically provided with a limited memory facility which allows the buffering of received data so as to allow the processing, such as the decoding of the same, to be done in the required manner to generate the audio, video and/or other information. In a first mode of operation, this is typically the only memory facility which is available. However, there is an increasing demand to provide the apparatus in a form in which there is provided a data storage facility which allows the storage of received data relating to television and/or radio programs so that this data can be stored and then subsequently selected to be viewed and/or listened to.

In order to allow the apparatus to be provided in the second mode of operation, the same is required to be provided with a data storage device, in this embodiment, in the form Of a hard disc drive.

In accordance with the invention, the set top box 14 can be adapted between the said first and second modes of operation either on site such as at a users premises or house, or at a service centre or at another selected location. This avoids the need for supplies of two separate versions of the apparatus to be carried and allows the same apparatus components to be continued to be used once the apparatus has been adapted from the first mode to the second mode.

Figure 2:
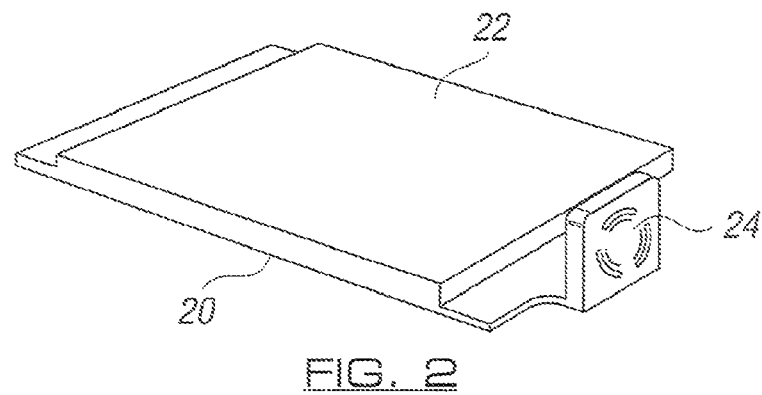
FIG. 2 illustrates an assembly in accordance with an embodiment of the invention.

FIG. 2 illustrates an assembly in accordance with the invention which allows the set top box apparatus to be adapted between the first and second modes. The assembly 20 includes a bracket to which a hard disc drive 22 and a cooling means in the form of a fan unit 24 are fitted. In addition, although not shown, mechanical engagement means are provided to allow the assembly to be engaged and retained with the set top box housing, electrical connection means are also provided to allow electrical connection between the assembly and set top box so as to allow the hard disc drive and fan unit to be operated from the electricity supply of the set top box. Furthermore, there is also provided at least one data connection to allow the transfer of data which has been received by the set top box 14 to the hard disc drive 22 of the assembly 20 and also in the opposite direction when it is desired to retrieve data from the data storage device to be used by the set top box to generate audio and data for television or radio programmes which have previously been received and can then be viewed or listened to.

Figure 3:
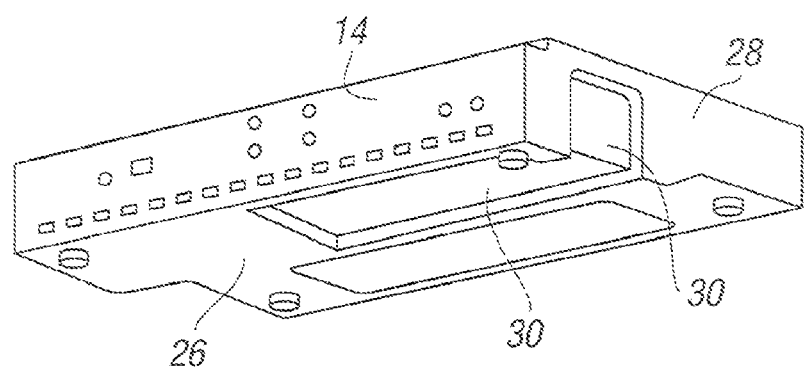
FIG. 3 illustrates apparatus in a first mode in accordance with the invention.

FIG. 3 illustrates the set top box apparatus 14 in the first mode in which it will be seen that there is provided a housing with a base 26 and side wall 28 and on part of the base 26 and part of the side wall 28 there is formed a recess 30. The recess is shaped to receive the assembly 20 in order to adapt the set top box to operate in the second mode. When in the first mode of operation, in which the assembly 20 is not connected in the recess, the recess 30 may preferably be masked or alternatively this may simply be left open, as shown for illustration purposes.

Figure 4:
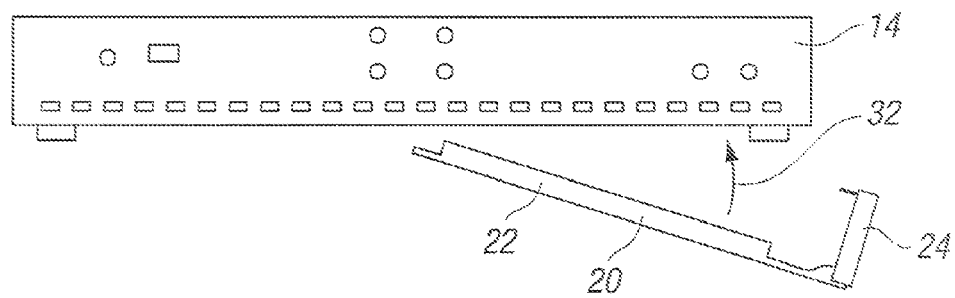
FIGS. 4 and 5 illustrate the apparatus of FIG. 3 being adapted to a second mode in accordance with the invention.
Figure 5:
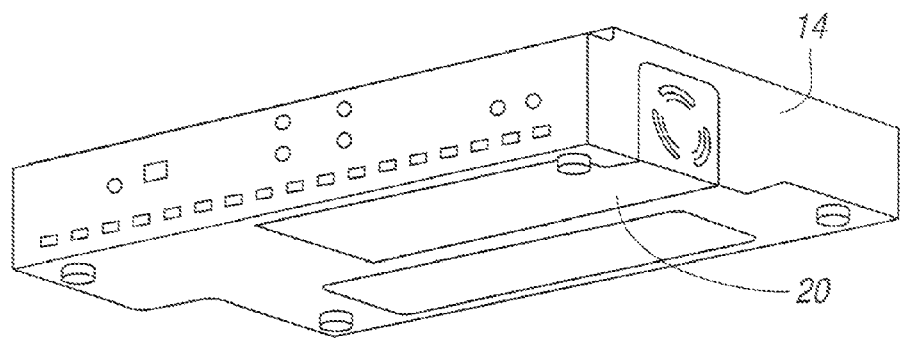

In accordance with the invention, when a customer makes a decision to have their set top box apparatus 14 upgraded to operate in the second mode and therefore to include the data storage device, they typically will do this by informing the data or service provider who will typically charge a premium for the upgraded mode of operation. When this has been done, the assembly 20 can be provided to be inserted into the recess 30 of the existing set top box, as illustrated by arrow 32 in FIG. 4 so as to mechanically and electrically connect the assembly with the set top box and locate the assembly 20 in the recess 30 as shown in FIG. 5. Engagement means are provided to mechanically engage the assembly 20 in position and thereby maintain the apparatus in the second mode. In one embodiment the assembly 20 can also be provided with cooling means as the provision of the data storage device in the form of the hard disc drive 22 generates heat and so the provision of the integral cooling means 24 achieves the required cooling effect. The cooling means is typically a fan and typically the power to operate the same is obtained from the set top box apparatus when the assembly is electrically connected to the housing of the same in the second mode of operation. The cooling means of the assembly may be the only cooling means provided in the apparatus or may be provided in addition to cooling means already provided in the set top box housing.

The operation of the set top box by the user is typically achieved by the user either contacting selected control buttons provided on the housing of the apparatus or via a remote control system in which the user has a remote control device and a wireless signal representing the desired control is transmitted from the remote control device to be received and processed by the apparatus. When in the first and second modes the control of the apparatus can be achieved in the same way with additional functions being possible and controllable when the apparatus is in the second mode. When the required control signal relates to the operation of the data storage device of the assembly the control signal is relayed from the apparatus to the assembly in order to allow the controlled operation of the same and this means that the user can control the apparatus in the first and second modes using a common control system.

There is therefore provided in the invention apparatus which can be adapted between first and second modes of operation in which, in the second mode of operation the apparatus has additional functionality, at least in the form of having additional data storage capacity and this achieved without the need to discard existing apparatus.

The invention claimed is:

1. Apparatus (14) for the reception and processing of digital data to represent audio, video and/or auxiliary information to a user of the apparatus (14) wherein said apparatus (14) is adaptable between: a first mode in which to receive and process the said data and in which the apparatus (14) includes a housing including electrical, data and mechanical connection means to allow connection of an assembly (20) containing cooling means in the form of a fan (24), and a data storage device (22) to allow the apparatus (14) to have a data storage facility for the storage of the received data in addition to the processing of the same; and characterized in that in a second mode in which said assembly (14) is located with the housing, the assembly (14) is located within a recess (30) formed in the base (26) and side wall (28) of the housing, such that the fan (24) is located in the portion of the recess (30) formed in the side wall (28) and the data storage device (22) is located in the portion of the recess (30) formed in the base (26).

2. Apparatus according to claim 1 wherein in the second mode the data storage device is of a size to allow the storage of a quantity of data which is sufficient so as to be subsequently retrieved and processed to generate a television or radio programme to be provided to the user of the apparatus.

3. Apparatus according to claim 1 wherein the adaptation between first and second modes is achieved by connecting the assembly with the apparatus to allow data transfer between the assembly and the apparatus of the first mode.

4. Apparatus according to claim 1 wherein the fan is operable Once the assembly is electrically and mechanically connected with said apparatus.

5. Apparatus according to claim 1 wherein when the apparatus is in the first mode the recess is enclosed by a masking means.

6. Apparatus according to claim 1 wherein the assembly is located in the recess without the need to remove any other parts of the housing.

7. Apparatus according to claim 1 wherein the components of the assembly include mechanically moveable components.

8. Apparatus according to claim 1 wherein when the apparatus is in the second mode the control of the data storage device is achieved via interaction with that part of the apparatus which is present in the first and second modes.

9. Apparatus for the reception and processing of digital data to represent audio, video and/or auxiliary information to a user of the apparatus, said apparatus comprising:
   a first mode in which to receive and process the said data and in which the apparatus includes a housing including electrical, data and mechanical connection means to allow connection of an assembly containing cooling means in the form of a fan and a data storage device to allow the apparatus to have a data storage facility for the storage of the received data in addition to the processing of the same; and
   a second mode in which said assembly is located with the housing characterized in that the assembly is located within a recess formed in the base and side wall of the housing, such that the fan is located in the portion of the recess in the side wall and the data storage device is located in the portion of the recess formed in the base such that when the assembly is located with the housing in the second mode, the base wall of the assembly forms part of the face of the said base of the housing, and the side wall of the assembly in which the fan is located forms part of the side wall of the housing.

* * * * *